April 19, 1966 U. S. MITCHELL ETAL 3,247,328

AUTOMATIC TAPE PROGRAMMING

Original Filed May 14, 1959 4 Sheets-Sheet 1

INVENTORS
ULYSS S. MITCHELL
A. ROBERT MYERS
BY
Lippincott & Ralls
ATTORNEYS

AUTOMATIC TAPE PROGRAMMING

Original Filed May 14, 1959

INVENTORS
ULYSS S. MITCHELL
A. ROBERT MYERS
BY
Lippincott & Ralls
ATTORNEYS

April 19, 1966 U. S. MITCHELL ETAL 3,247,328

AUTOMATIC TAPE PROGRAMMING

Original Filed May 14, 1959 4 Sheets-Sheet 3

INVENTORS
ULYSS S. MITCHELL
A. ROBERT MYERS

BY

Lippincott & Ralls
ATTORNEYS

INVENTORS
ULYSS S. MITCHELL
A. ROBERT MYERS
BY
Lippincott & Ralls
ATTORNEYS

United States Patent Office 3,247,328
Patented Apr. 19, 1966

3,247,328

AUTOMATIC TAPE PROGRAMMING

Ulyss S. Mitchell, San Mateo, and Alva Robert Myers, Mountain View, Calif., assignors, by direct and mesne assignments, to Sierra Capital Company, San Francisco, Calif., a corporation of California, and Continental Capital Corporation, San Francisco, Calif., a corporation of California Continuation of application Ser. No. 813,207, May 14, 1959. This application Oct. 4, 1961, Ser. No. 142,910
1 Claim. (Cl. 179—100.2)

The present invention relates in general to the provision of magnetic tape programming and more particularly to the automatic sequencing of individual portions of a complete program with a wide latitude of preselection control.

This application is a continuation of copending application Serial No. 813,207, filed May 14, 1959, and now abandoned, entitled, "Automatic Tape Programming."

With the advent of modern tape recording techniques and apparatus, there is provided a very convenient means for the recording, handling and playback of audio signals. Although magnetic tape recording is also applicable to the field of video signals, insofar as the present invention is concerned, no difference is encountered as to procedures or apparatus, regardless of the type of signal carried by the magnetic tape. Consequently, the following disclosure and discussion is referenced to audio recording. Magnetic tape recordings have received widespread attention and application with innumerable advancements being made not only in the field of recording processes themselves, but also in the handling and utilization of the magnetic tape itself. Of particular advantage in this latter relation is the development of endless magnetic tape cartridges wherein magnetic tape wound upon a rotary member within a single cartridge is available for utilization with a single playback head without requiring additional reels, drives or the like in association with the cartridge. In the utilization of magnetic tape recording, it has been proposed to record a complete program upon a single tape with a large plurality of music and voice selection recorded in preselected order upon the tape for playback to thereby provide an automatic programming of the selections. This type of programming with magnetic tape recording, despite certain limitations attendant thereto, has found rather widespread applicability.

As regards the further potentialities of magnetic tape recording in connection with programming for radio transmission or the like, it will be appreciated that the system of prerecording a desired sequence of individual selections upon a tape for a later playback as a single program contains certain inherent limitations which are highly undesirable. Thus, for example, a single tape so recorded to include a plurality of preselected musical selections or the like, interspersed with desired voice comments or advertisements, as might be employed in a single radio program, is generally only suited for a single use, inasmuch as repetition of the same program is not generally warranted. Furthermore, the inflexibility of this approach is immediately apparent, for no variation in the program is possible once it has been recorded upon the single program tape. Although these limitations upon conventional magnetic tape programming are well recognized in the art, no suitable solution thereto or improvement thereon has received widespread acceptance.

The present invention provides automatic tape programming utilizing magnetic tape recording, wherein a high degree of flexibility is afforded. It is contemplated by the present invention that individual selections shall be consecutively recorded upon magnetic tape, and furthermore, that a plurality of magnetic tape cartridges shall be employed in a single program. There is provided herewith means for preselecting from a plurality of tapes the individual magnetic tape that shall be played at any particular time and following any particular selection from another or the same tape. The foregoing is herein accomplished with a minimum of complexity and cost of equipment. More specifically, the present invention provides means for mounting a plurality of magnetic tape cartridges, together with means for playing the tape from any selected cartridge in response to a signal received from a selector unit. This selector unit includes means for predetermining the sequence of the selections to be played during a particular program which in itself may be set up upon the selector unit. Not only is a wide degree of flexibility afforded by the system hereof, but furthermore, the individual magnetic tapes may be reused in different programs for no particular sequence of selections are required to be recorded upon any individual tape. In accordance herewith, a single program may include the playing of one or more selections from one tape followed by the playing of a different type of selection, such as an advertisement, from another tape and additional playing of musical selections, for example, from yet another tape, all at the preselected control of the operator.

In addition to the foregoing features of the present invention, there is also included herewith means for automatically proceeding with the preselected program in a circumstance where a single magnetic tape may break. Although a broken magnetic tape formerly constituted a serious hazard to tape-recorded programs, in accordance with the present invention only a minor inconvenience arises therefrom and no serious or permanent disruption of the program is caused thereby.

The present invention provides a simple and inexpensive programming system and apparatus which is readily adapted to any and all types of magnetic recording and utilization. The full automation hereof removes the necessity of continued personal supervision of the playing of a program of any desired type. The flexibility afforded by this invention further enhances the advantages thereof, in that a much greater latitude of program selectivity is made available thereby, and the necessity of sequence recording or re-recording is herein precluded.

It is an object of the present invention to provide an improved programming system employing magnetic tape recordings.

It is another object of the present invention to provide an improved means for preselecting a sequence of selections to be successively played back from a plurality of magnetic-tape cartridges.

It is a further object of the present invention to provide an improved playback arrangement for a plurality of magnetic-tape cartridges.

It is yet another object of the present invention to provide a playback unit with preselection means for automatic sequencing of individual tape playback.

It is a still further object of the present invention to provide an improved automatic tape programming that automatically proceeds with the program upon fault or failure of either tape or cartridge.

It is another object of the present invention to provide a simplified and inexpensive tape programmer.

It is yet another object of the present invention to provide silent sensing control for automatic programming of tape-recorded selections.

Various other possible objects and advantages of the present invention will become apparent to those skilled in the art from the following description of a preferred embodiment of the present invention; however, it is not intended to limit the present invention to the precise terms of the following disclosure, and instead, reference is made to the appended claim for a precise delineation of the true scope of this invention.

A preferred embodiment of the present invention is illustrated in the accompanying drawing, wherein.

Figure 1:
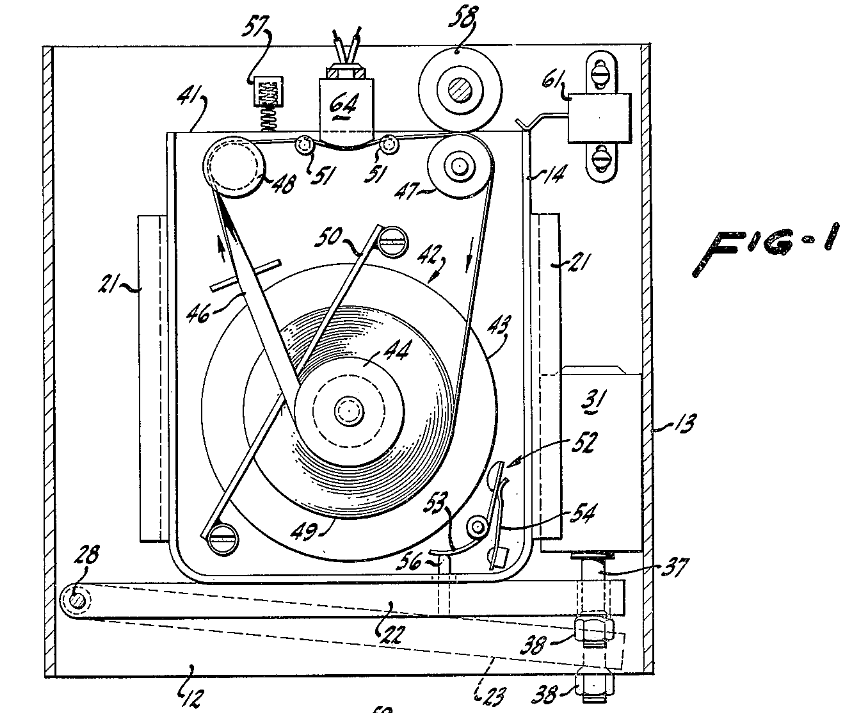
FIGURE 1 is a plan view of a multideck mounting unit for a multiplicity of cartridges and having the top cover removed to illustrate an endless tape cartridge inserted within the unit.
Figure 2:
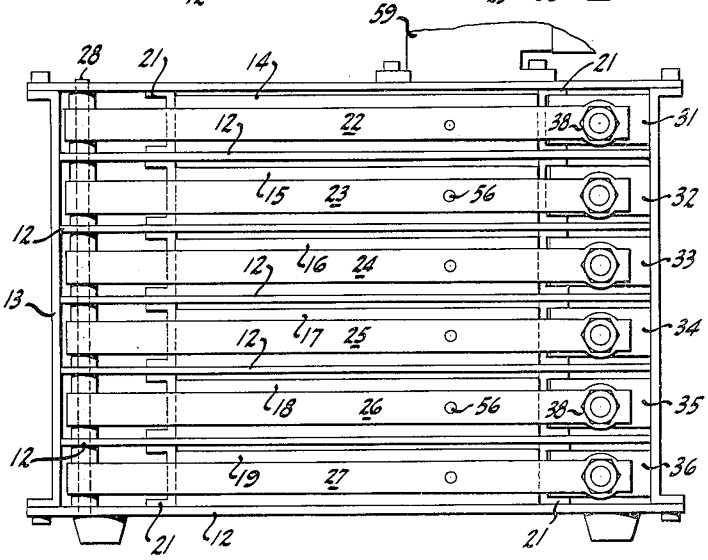
FIGURE 2 is a front elevational view of the mounting unit of FIGURE 1.
Figure 3:
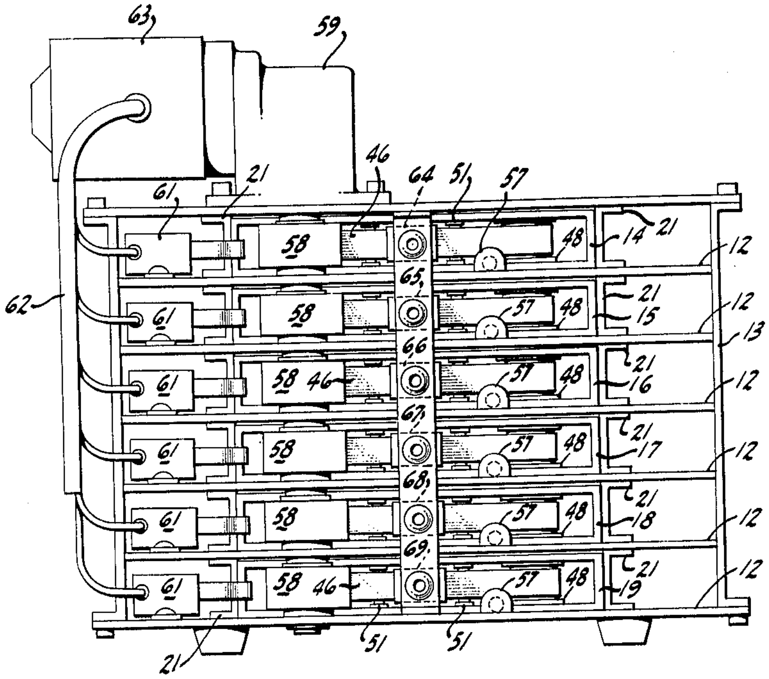
FIGURE 3 is a rear elevational view of the unit of FIGURE 1.

Considering now a preferred embodiment of the present invention in some detail, and referring to FIGURES 1, 2 and 3 of the drawing, there is provided a multideck mounting and playback unit 11 including a plurality of parallel, vertically spaced, horizontal decks 12 having at least a pair of side walls 13 connected thereto for maintaining structural rigidity of the unit. An endless magnetic tape cartridge 14 is adapted to be disposed upon the upper deck of the mounting and playback unit 11 and similar cartridges 15 to 19 are adapted for individual disposition upon the separate decks of the unit. Suitable guide means 21 are provided on each of the decks in order to properly orient the tape cartridges inserted thereupon, and in the illustrated orientation of the mounting and playback unit 11, these guide means 21 may comprise parallel spaced rails secured in upright extension to the individual decks 12. The separation of the two portions of the guide means 21 is just sufficient to accommodate a magnetic tape cartridge in sliding relation between the guide means so that no possible canting or other undesirable motion of the cartridge is possible when same is inserted between the guide means upon the deck. A plurality of gates 22 to 27 are provided upon the mounting unit 11 for the purpose of closing the openings between the decks at the front of the unit and for individually moving the endless tape cartridges 14 disposed upon such decks. The gates 22 to 27 are separately mounted in pivotal relationship upon a vertical pivot bar 28 extending through the decks 12 adjacent the front corner of the mounting unit 11. Each of the gates 22 to 27 extends across the openings between separate decks 12 so that there is provided by this gate arrangement a vertical array of gates individually closing the openings between the separate decks at the front of the mounting and playback unit 11.

Upon the individual decks of the mounting and playback unit 11 there are provided means for moving the individual gates associated with each deck to thereby move individual magnetic tape cartridges disposed upon a deck into and out of engagement with playback means associated with the unit 11. Such means may comprise a plurality of electric solenoids 31 to 36 disposed one upon each of the decks 12 adjacent the front of the mounting unit and at the opposite side thereof from the pivot bar 28. The solenoids 31 to 36 are oriented to dispose the plungers 37 thereof in extension toward the front of the mounting and playback unit. The solenoid plungers are separately connected in removable attachment to the individual gates 22 to 27 so that actuation of the individual solenoids 31 to 36 will controllably pivot the individual gates 22 to 27 about the pivot bar 28. The solenoids are rigidly affixed upon the separate decks 12 by suitable mounting means so that the solenoid windings are immovable and energization of the windings through appropriate control means, set forth below, operates to draw the plunger into the winding of a solenoid energized. Suitable spring return means are included in each of the solenoids so that the normal solenoid plunger position is in extension from the winding portion of the solenoid. The individual solenoids are mounted relative to the individual gates so that when the solenoid deenergizes, the gates are disposed in alignment across the front of the mounting and playback unit. Preferably, the solenoid plungers extend through slots provided in the free ends of the gates 22 to 27 with a removable expanded portion such as a nut or the like, 38, secured to the plunger on the opposite side of the gate from the solenoid winding so as to maintain connection between the gate and solenoid plunger. Opening of the gates for insertion or removal of cartridges may be accomplished by removal of the locking means 38 upon the solenoid plunger so as to free the gate whereby they may be pivoted about the vertical pivot bar 28 to open the space between the decks 12.

As regards the individual magnetic tape cartridges, they may be conventional in composition and construction. As illustrated in FIGURE 1 of the drawing, such as cartridge may include a base plate 41 having upturned sides and ends formed therefrom, and mounting thereon a film reel 42 in rotatable relation thereto. Such film reel may include a lower reel plate 43 with an upstanding reel hub 44 mounted thereon. An endless magnetic tape 46 is wound about the hub 44 upon the reel plate 43. A pinch wheel 47 is mounted upon the cartridge base 41 for rotation in substantially the same plane as the reel 42 and a tape guide 48 is likewise mounted upon the cartridge base 41. The pinch wheel 47 and guide 48 are disposed adjacent the rear edge of the cartridge whereat the cartridge side wall is cut away or dispensed with and the magnetic tape 46 is extended from the center of the hub 44 about the guide 48 and thence about the pinch wheel 47 back to the outer periphery of a roll 49 formed by the tape wound about the hub. In conventional manner, this magnetic tape may be twisted in extension from the hub 44 of the reel in order to conveniently pass over the top of the tape roll 49, and likewise, suitable and conventional guide means such as a wire 50 or the like may be provided to insure the free passage of magnetic tape in extension from the reel. As it is intended that the magnetic tape in passage between the guide 48 and pinch wheel 47 shall be contacted by playback means for accepting intelligence transcribed upon the tape, there may also be provided a pair of positioning pins 51 in extension upwards from the cartridge base 41 between the guide and pinch wheel and adapted to maintain a desired tape position during playback thereof. As a further portion of the cartridge 14, there is preferably provided a reel brake 52 which may include a pivotally mounted brake member 53 disposed atop the base plate 41 and adapted for pivoting into engagement with the periphery of the reel plate 43 to prevent rotation thereof. A leaf spring 54 may be also mounted upon the cartridge base plate 41 in resilient engagement with the pivotal member 53 of the brake and urging the brake against the reel. By extension of the pivotal member 53 on opposite sides of the pivot point thereof, as illustrated in FIGURE 1, the brake is adapted to be operated by pressure on such extension to thereby resiliently deform the member 54 to pivot the brake away from the reel and release same for rotation. Such brake release is herein accomplished by the provision of a pin 56 extending inwardly of the mounting unit from the gate 22 and adapted to engage the brake pivot member 53 for swinging the brake out of engagement with the reel 42 so as to free same for rotation. This brake will thus be seen to operate to prevent rotation of the reel 42 at such time as the cartridge 14 is not disposed within the mounting unit and the gate thereof is not closed.

Like magnetic-tape cartridges are adapted for disposition upon each of the decks of the mounting and playback unit and each of the gates 22 to 27 is provided with brake release pins similar to the one shown in FIGURE 1 and described above. Each of the decks of the mounting unit is provided with ejecting means operable to force the magnetic-tape cartridges from the decks against the gates closing same. Such an eject unit is illustrated at 57 in FIGURE 1 wherein it will be seen that same need only include a spring disposed against a stop firmly affixed to the deck and extending towards the front of the mounting unit from the rear edge of the individual decks thereof. Insertion of a cartridge within the space between two decks of the mounting unit will resiliently compress the spring of the eject means so that the cartridge is at all times spring loaded so as to tend to move out of the mounting unit against the restraint of the approprite gate closing the deck space within which such cartridge is disposed.

There is additionally provided as a portion of the mounting and playback unit of this invention a capstan or tape drive means 58 which may include a vertically disposed axle mounted in rotatable relation within the mounting unit and having appropriately enlarged portions extending over each of the decks and further disposed in such lateral orientation as to be aligned with the pinch wheel of the individual cartridges adapted to be inserted upon the decks. Suitable means, such as a small electric motor 59, is connected to the capstan 58 for rotating same at a desired and controllable angular velocity, as discussed below. This motor 59 may conveniently be mounted atop the mounting and playback unit 11, as indicated in FIGURE 3 of the drawings.

As a further and additional portion of the mounting and playback means of the present invention, there are provided a plurality of playback heads 64 to 69 disposed one on each deck of the unit. These playback heads 64 to 69 are individually aligned in relationship to the guide means 21 for the magnetic-tape cartridges so as to be disposed between the positioning pins 51 at the inner or open end of such cartridges. As illustrated in FIGURE 1 of the drawings, the playback head 64 is oriented to engage with the magnetic tape 46 of an individual cartridge 14 when such cartridge is inserted between the guide means 21 and is moved rearwardly of the mounting and playback unit toward such playback head. Appropriate electrical connections, not shown, are provided to each of the playback heads 64 to 69 to conduct electrical signals picked up therefrom by the passage of magnetic tape thereover, and to transmit same to such circuitry as may be associated with the mounting and playback unit. Inasmuch as endless tape cartridges are conventionally provided for different speeds of operation thereof, provision is herein made for accommodating any desired reel speed. Speed control means 61 are provided upon each of the decks of the mounting and playback units for the purpose of controlling the speed of rotation of the capstan 58 as dictated by the drive motor 59. Various means are available for indicating to the speed control means which particular capstan speed is required for the individual cartridge to be played. Commercially available cartridges are adapted to play at speeds of 1⅞ inches per second, 3.75 inches per second, and 7.5 inches per second, and appropriate speed control is herein provided for each of these different conventional reel speeds. As an example of a suitable arrangement, there may be provided a switch arm extending from the speed control means 61 and aligned with such a point upon the cartridge that same will be engaged by the cartridge adapted to be rotated at 3.75 inches per second, while the structural differences of a cartridge adapted to be rotated at a speed of 7.5 inches per second does not interpose any cartridge member in position to engage such switch arm. Suitable electrical connections, as by means of a cable 62, are made between the speed control means 61, on each of the decks to a control box 63 attached to the motor 59 whereby the speed of rotation of the capstan drive motor 59 is controllable from any of the decks 12.

It will be appreciated from the above description of the mounting and playback unit of the present invention, that same is adapted to contain a plurality of magnetic-tape cartridges which may be individually moved into position for engagement of the magnetic tape thereon with a playback head. As a further portion of the present invention, there is provided a selector unit which provides for the automatic sequencing of cartridge playback in accordance with a preselected order.

Figure 4:
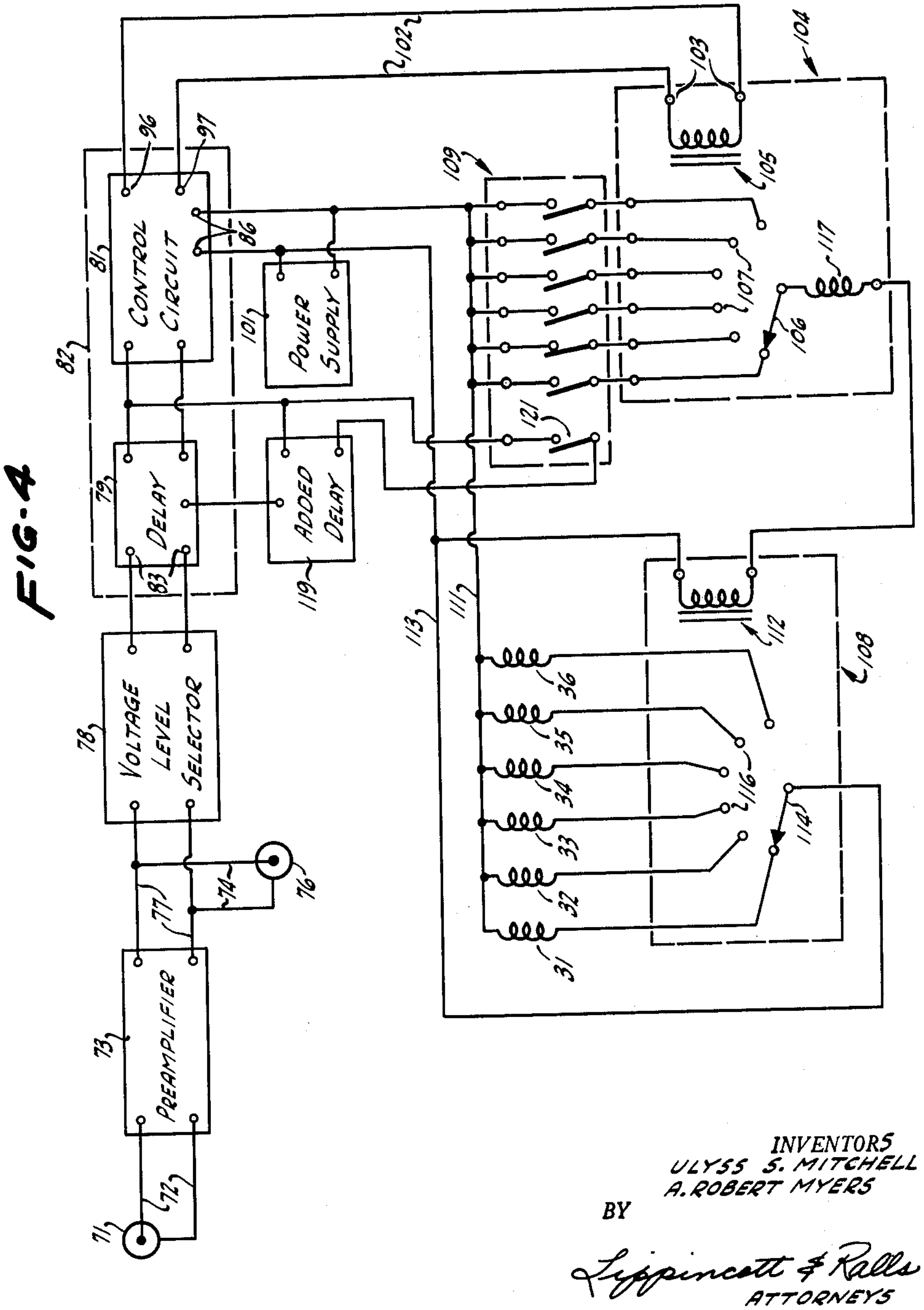
FIGURE 4 is an electrical circuit diagram, partially in block illustration, of an automatic programming circuit connected to and controlling the multideck unit of FIGURES 1, 2 and 3.

Considering now the details of a preferred embodiment of the automatic tape selector unit of the present invention, and referring to FIGURE 4 of the drawing, there will be seen to be illustrated therein an input unit 71 which may comprise the playback heads 64 to 69 of the above described mounting and playback unit. Electrical signals generated at the input 71 are applied through conductors 72 to a preamplifier 73 for increasing the amplitude thereof and the output of this preamplifier is applied through conductors 74 to suitable audio reproduction means indicated schematically merely as an output 76. Such output may, of course, include such as a speaker, amplifier, and associated equipment as is conventional. The output of the preamplifier 73 is also applied through conductor 77 to a selector unit 78 of conventional circuitry and providing therein control over the amplitude of the output voltage therefrom. The output of the voltage level selector 78 is coupled through delay circuitry 79 to a control circuit 81, with such delay means and control circuitry being in combination herein denominated a control unit 82 and further illustrated in FIGURE 5 of the drawings.

Figure 5:
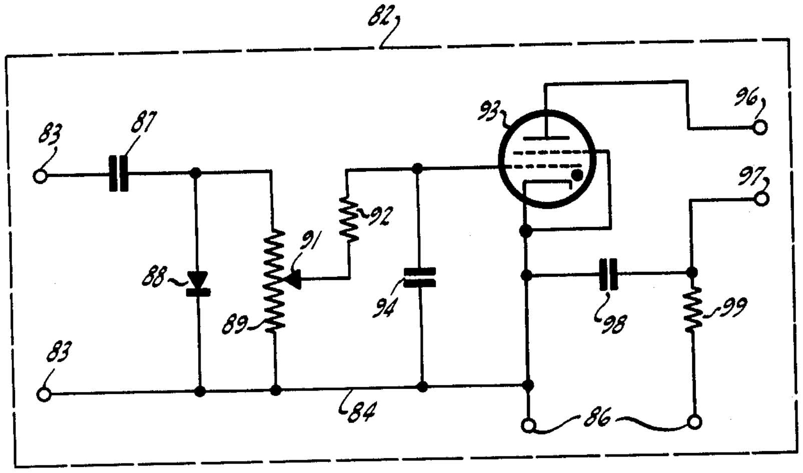
FIGURE 5 is a circuit diagram of the control unit of FIGURE 4.

Before proceeding with the actual switching portion of the automatic tape selector unit of the present invention, reference is made to the operation of the above described circuitry and including the control unit illustrated in FIGURE 5. A pair of input terminals 83, also illustrated in FIGURE 4 of the drawing, receives a voltage signal in response to the magnetic tape signal produced at the input unit 71 and reproduced at the output unit 76 of the invention. Through one of the control unit input terminals 83, there is connected a common or ground line 84 which extends uninterrupted through the delay circuitry and the control unit to the one of a pair of power supply terminals 86 adapted for connection to the negative terminal of a direct current power supply. The other input terminal 83 is coupled through a capacitor 87 to the positive side of a unidirectional device such as a rectifying diode 88 connected in turn to the ground line 84. This coupling capacitor 87 also connects to one side of a time-delay resistor 89 which is likewise connected to the ground line 84. A movable contact arm 91 is provided upon this time-delay resistor 89 and is, in turn, connected through a resistor 92 to a first control electrode of a gaseous discharge device 93. Such discharge device 93 has the cathode thereof directly connected to the ground line 84 and a capacitor 94 is connected between the aforementioned first control grid of the thyratron and the cathode thereof to normally bias the tube to cut-off.

A second control grid which may be provided in the thyratron 93 is electrically connected to the cathode thereof. A pair of control unit output terminals 96 and 97 are connected with the first thereof directly coupled to the anode or plate of the thyratron 93 and the other terminal 97 coupled through a capacitor 98 to the cathode of the thyratron 93. A resistor 99 couples the output terminal 97 to the power supply terminal 86 which is adapted for connection to the positive side of a direct current power supply connected across the terminals 86.

As is set forth in detail below, an impedance unit connected between the control unit output terminals 96 and 97 is adapted to produce switching operations in response to the application of voltage pulses across same between these output terminals. As regards the operation in general of the above described control unit, there is provided between the input terminals 83 thereof a signal of sufficient magnitude to maintain the capacitor 94 charged during the passage of a signal between the input 71 and output 76 of the overall unit. A negative signal of predetermined amplitude is applied to the upper input terminal 83 of the control unit from the selector 78 and is thence coupled through the capacitor 87 to maintain such a charge upon the capacitor 94 that the first control electrode of the thyratron 93 is maintained at a negative potential with respect to the thyratron cathode during such time as an output signal is received at the output unit 76. Upon the cessation of input signals, the signal between the control unit input terminals 83 disappears and consequently the charge upon the capacitor 94 leaks off through the resistors 89 and 92 at a rate determined by the total effective resistance inserted in circuit about this capacitor. A controllable time delay is thus introduced by the capacitor-resistor combination and after the elapse of such predetermined time for discharging of the capacitor 94, the first control electrode of the thyratron reaches substantially the same potential as the cathode of such tube whereby the tube will conduct. Conduction of the tube 93 is accomplished by the charge upon the capacitor 98 connected between the anode and cathode of the tube. It will be seen that the capacitor 98 is charged by the power supply connected between the power supply terminals 86 through the resistor 99 so that upon conduction of the tube 93 the capacitor 98 is rapidly discharged through the impedance existing between the output terminals 97 and 98 to thereby produced a control signal therebetween. Such control signal is utilized in controlling preselection switching, as set forth in more detail below.

Referring again to FIGURE 4, it will be seen that a power supply 101 is connected between control unit terminals 86 and the output terminals 96 and 97 of the control unit 82 are connected by leads 102 to the control terminals 103 of a first stepping switch 104. There will thus be seen to be connected between the output terminals of the control unit the control winding 105 of the stepping switch 104 so that there is, in effect, produced a stepping pulse in the switch 104 corresponding to each conduction of the control tube 93 and the control unit 82. As above noted, the control tube 93 conducts only upon cessation of an input signal to the control unit, and thus the stepping switch 104 will be seen to be operated to step at each time that no signal is produced by any of the playback heads of the input unit 71. Considering the stepping switch 104 in more detail, same will be seen to include in addition to a motivating coil 105 connected between the input terminals 103 thereof, a rotary contact 106 adapted to be stepped successively between a plurality of separate stationary contacts 107 conventionally disposed in an arc about the center of motion of the rotary contact 106. The first stepping switch 104 is provided for the purpose of controlling the operation of a second stepping switch 108 which, in turn, controls the energization of the separate solenoids 31–36 of the mounting and playback unit 11. Such control is herein achieved in a maximum flexibility by the provision of a switch bank 109 containing a plurality of individual switches connected between separate ones of the rotary contacts 107 of stepping switch 104 and a direct current buss 111 of the power supply 101. The rotary switch arm 106 of the stepping switch 104 is connected through a motivating or control winding 112 of the second stepping switch 108 to another direct current buss 113. By the presetting of the individual switches of the switch bank 109 so as to close such switches as are desired, it will be seen that stepping of the rotary contact 106 between the stationary contacts 107 in response to signals from the control unit 82 will either actuate the stepping switch 108 or not, depending upon whether the particular stationary contact 107 engaged by the rotary contact 106 is connected through a closed switch to the direct current buss 111 or not. The second rotary switch 108, like the above described first stepping switch 104, includes a rotary contact 114 disposed for movement in response to pulses in the winding 112 about an arc of stationary contacts 116.

The solenoids 31—36 of the mounting and playback unit 11 have the windings thereof connected in parallel arrangement between the separate stationary contacts of the stepping switch 108 and the direct current buss 111. More specifically, the rotary contact 114 of the stepping switch 108 is directly coupled to the direct current buss 113 and the separate stationary contacts 116 of the stepping switch 108 are individually connected through separate solenoid windings 31–36 to the other direct current buss 111. In this manner, the application of a signal to the stepping switch coil 112 from the first stepping switch 104 will produce a movement of the rotary contact 114 from one of the stationary contacts 116 to another stationary contact 116 thereof to thereby transfer connections of the power supply from one of the solenoid windings to another. Energization of the individual solenoids will thus be seen to be controlled by the stepping switch 108 in response to positioning of the stepping switch 104 and of the individual switches of the switch unit 109. Actuation of the first stepping switch 104 is, in turn, controlled from the control unit 82 in respone to the absence of signals from the input unit 71 formed of the playback heads 54–59.

Considering now the overall operation of the present invention, the mounting and playback unit 11 is loaded by the insertion of separate magnetic-tape cartridges 14–19 in the separate decks of the unit and the closing of these decks by the connection of the gates 22–27 to the solenoids 31–36, respectively. Upon the individual magnetic tapes 46 of the separate magnetic-tape cartridges there have been prerecorded such desired selections as are to be included in the program to be presented. With the provision of a mounting and playback unit having six decks, there is provided an alternative of six possible selections that may be played at any particular time. An individual magnetic tape is played following the energization of the solenoid upon the deck holding such tape. Thus, for example, considering the top deck of the mounting and playback unit, energization of the solenoid 31 causes the plunger 37 thereof to retract into the solenoid housing or winding to thereby pivot the gate 22 about the vertical pivot bar 28. As the gate 22 is drawn inward of the deck by the solenoid plunger 37 in response to energization of the solenoid winding, the gate bears upon the cartridge 14 to thereby urge same rearwardly of the deck toward the drive capstan 58 and the playback head 60. As noted above, the pinch wheel 47 of the cartridge 14 is disposed in alignment with the drive capstan 58 so that as the cartridge is moved rearwardly upon the deck 12, the magnetic tape 46 threaded about the pinch wheel 47 is pressed against the drive capstan 58 to thereby become pinched between same and the pinch wheel 47. In this position, the playback head 64 fully engages the magnetic tape 46 between the guide 48 and the pinch wheel 47, while proper tape alignment with the playback head 64 is insured by the aligning pins 51 upon the cartridge. Rotation of the capstan 58 will frictionally drive the pinch wheel 47 and the tape 46 threaded thereabout so that the magnetic tape is withdrawn from the reel 49 thereof at the wheel hub 44 so as to pass about the guide 48 and across the playback head 64. This magnetic tape, being endless, further moves from the pinch wheel 47 back on to the outer periphery of the tape reel 49 atop the reel plate 43. As the tape is pulled across the playback head 64 by the rotating capstan 58, electrical signals are generated in the playback head in accordance with such signals as may have been recorded upon the magnetic tape, in a conventional manner. The electrical signal produced in the playback head 64 by the magnetic tape passing thereover is applied through the conductor 72 to the preamplifier 73 wherein the signal amplitude is increased for application through the conductor 74 to the output 76 of the apparatus. This signal is further applied through conductor 77 from the preamplifier to the voltage level selector 78. This selector 78 produces a negative signal in response to the receipt of signals from the magnetic tape 46 and applies same to the input terminals 83 of the control unit 82. The negative signal applied from the selector 78 serves to maintain the capacitor 94 in the control unit negatively charged so as to retain the control tube 93 in a non-conducting state. By maintenance of a relatively negative potential upon the first control electrode of this control tube 93, the tube is maintained non-conducting even though the capacitor 98 connected between the anode and cathode thereof is charged from the positive direct current input terminal 86 so as to support tube conduction As the control tube 93 is maintained non-conducting, no signal is applied between the output terminals 96 and 97 of the control unit 82. Consequently, the switching portion of the automatic cartridge selector is maintained in status quo during such time as a selection is being played from any of the tapes of the various cartridges 14 to 19 in the mounting and playback unit. Individual selections are recorded upon the magnetic tape 46 with a slight time delay therebetween, and thus consequently at the termination of the playing of an individual selection of music or voice there is no signal applied to the input 71 of the unit. Cessation of an input signal immediately causes a like cessation of an output signal from the selector 78 so that no negative voltage or signal then appears between the input terminals 83 of the control unit 82. In the absence of a negative voltage applied to the capacitor 94 of the control unit 82, the charge upon this capacitor will then leak off through the resistors 89 and 92 so that the capacitor charge reduces to a desired level in a controlled period of time. At the reaching of such capacitor charge level, the first control electrode of the thyratron 93 is maintained insufficiently negative to prevent conduction of such tube and consequently the tube conducts to discharge the capacitor 98 through the winding 105 of the stepping switch 104 connected between the output terminals 96 and 97 of the control unit. This current flow through the winding of the stepping switch 104 produces a stepping action in the switch to thereby move the rotary contact 106 from one of the stationary contacts 107 to the next adjacent contact, all in a conventional manner.

The resultant effect upon the program from the application of a control pulse from the control unit 82 is at least in part dependent upon the setting of the individual switches of the switch unit 109. Thus, if the rotary switch 106 is moved to a stationary contact 107 which is connected through a closed switch to the direct current buss 111, there will be provided a complete electrical circuit through the winding 112 of the second stepping switch 108. This circuit connects the winding 112 of the second stepping switch 108 across the direct current busses 111 and 113 so that there is consequently produced a stepping action in the second stepping switch 108.

The first stepping switch 104 may be conveniently constituted with a reset coil 117 provided therein for returning the rotary contact 106 to the zero position of the switch upon the incidence of conduction through the switch. This reset coil 117 may thus be connected in circuit between the rotating contact 106 of the switch 104 and the coil 112 of the switch 108. With these connections, the first stepping switch 104 will be seen to reset itself automatically upon reaching a stationary contact which is connected through a closed switch of the bank 109 thereof to the power supply buss 111. As soon as electrical conduction occurs through the switch 104 via the stationary and rotary contacts thereof, the reset coil is energized to return the rotary contact to the zero position of the first stepping switch. It will thus be appreciated that the setting of the individual switches of the switch group 109 determines the number of selections that shall be played from each of the magnetic tape cartridges. For example, if the third switch of the switch bank 109 is closed and the remainder of the switches thereof are left open, the first two impulses from a control unit 82 will move the rotary contact 106 of the first stepping switch 104 to successive stationary contacts of this switch without other results to the circuit. As soon as the third pulse from the control unit 82 reaches the stepping switch 104, the rotary contact of this switch will move into electrical contact with the stationary contact of the switch which is joined through a closed switch of the switch bank 109 to the direct current buss 111. In this condition electrical conduction will occur through the first stepping switch 104 and thence through the control coil 112 of the second stepping switch 108 to thereby actuate the second stepping switch. At the same time, this current flow through the switch 104 will energize the reset coil 117 of the switch to thereby reset the rotary contact thereof to the zero position of the switch. Such conduction through the rotary switch 104 serves to apply a voltage pulse to the control winding 112 of the second stepping switch 108 whereby the rotary contact 114 thereof is stepped only to the next stationary contact 116 of the switch. As a consequence of this stepping action in the second stepping switch 108, a different solenoid of the group of solenoids 31 and 36 thereof is electrically energized to consequently operate the connected gate of the mounting and playback unit. At the same time, the previously energized solenoid is deenergized so that the gate connected thereto pivots outwardly from the magnetic-tape cartridge and the cartridge is forced away from the playing head by the return spring mounted upon the mounting and playback unit.

It will be appreciated that a substantial degree of flexibility is afforded by the above described system for the electrical wiring of the solenoids 31 to 36 to the stationary contacts 116 of the second stepping switch 108 may be varied at will so that a desired sequence of solenoid energization results from the successive connection of the rotary contact 114 to the separate stationary contacts 116 of this second stepping switch. With the above described embodiment of the invention, it will be seen that any chosen number of selections may be played from each of the magnetic tapes disposed upon the separate decks of the mounting and playback units by the closure of a desired one of the switches of the switch bank 109. Also, the desired sequence of magnetic-tape cartridges selected for playing is determined by the connection of the separate solenoid to particular contacts of the second stepping switch 108. For many applications, a suitable degree of flexibility is afforded by this above described circuitry; however, materially enhanced flexibility and selectivity may be afforded by the provision of a greater number of switches in the switch bank 109, as set forth in more detail below.

Provision is herein made for preventing serious disruption of a program by damage or injury to the tape of any cartridge mounted upon the mounting and playback unit. Thus, for example, in the event that a tape should break or part during playing of same, the playback head associated therewith would cease to produce electrical signals and consequently no signal would appear at the input 71 of the automatic programming unit. This cessation of input signals would operate to produce an output pulse between the terminals 96 and 97 of the control unit 82 so that the above described stepping action would result, and would in fact be continued until a separate solenoid were energized. Upon the energization of a different solenoid, there would be moved into engagement with a different playing head a whole and operable magnetic tape so that the program would continue. It has, however, been determined that magnetic tape is more prone to part or break at the initiation of playing same and normal safety features are inadequate to continue the program in such instances. In order to prevent disruption of the program by such a happening, there is herein provided an added delay circuit 119. Electrical connection is made from the added delay circuit 119 to the juncture of the delay circuit 79 and the control circuit 81 of the control unit 82 and likewise provision is made for removing this added delay circuit from the system by providing connection therefrom across a switch 121 which may be conveniently located in the switch bank 109. With the switch 121 closed, the added delay circuit 119 is inserted in the control unit circuitry so that a substantial delay as may result from a broken tape, will cause the control tube 93 to momentarily conduct. This conduction extends for a period as determined by the charge upon the capacitor 98 and serves to produce a voltage pulse between the output terminals 96 and 97 of the control unit 82 whereby the first stepping switch 104 is actuated. While it may be possible that a single actuation of the first stepping switch 104 will not serve to energize a different solenoid of the mounting and playback unit, depending upon the setting of the individual switches of the switch bank 109, yet the foregoing is repeated with the stepping switch 104 continuing to step to separate stationary contacts thereof until the second stepping switch 108 is energized and a different solenoid is, in turn, energized to move another magnetic-tape cartridge into position for playback. In this manner then, no complete program disruption is possible by the failure of a single magnetic-tape cartridge or the tape thereon. In the event that this feature is not desired for a particular application of the automatic programming unit, the switch 121 may be opened to thereby remove the added delay circuit 119 from the circuitry of the control unit 82.

Innumerable variations are possible in the programming which may be selected and provided in accordance with the present invention. As described above, the illustrated programming unit is set up to play a desired number of selections from each of the magnetic tapes of the mounting and playback unit. Thus, where the second switch of the switch bank 109 is closed, two selections would be played from each of the magnetic tapes. The sequence of tapes which are played would be determined by the electrical connection of the individual solenoids to the separate stationary contacts 116 of the second stepping switch 108. Further, an additional programming selection may be afforded by a multiplication of the number of switches provided in the switch bank 109. Thus, provision may be made for playing a different number of selections from each of the decks of the mounting and playback unit and consequently from the tapes mounted thereon. In this instance, the first stepping switch 104 may be wired to exclude the reset coil from the circuit thereof. With the first stepping switch 104 consequently arranged to move successively between consecutive stationary contacts 107 thereof without resetting, each of the stationary contacts may be connected through a separate switch of the switch bank 109 so that a complete program may be set up upon the switch bank. In this instance, it is necessary to provide for limitation of the duration of the voltage applied to the control winding 112 of the second stepping switch 108, inasmuch as a continued application of voltage to such winding would normally serve to drive the rotary contact 114 thereof through a succession of steps. This circuitry is readily attained by the provision of a capacitor-resistor combination connected in the lead from the first stepping switch to the second. By charging of the capacitor during the playing of a selection and by discharging of same through the control winding

112 of the second stepping switch, a pulse of voltage would be applied to the control means of the second stepping switch so as to limit the operation of same to a single step for each separate energization. More specifically each stationary contact 107 of the first stepping switch 104 would in this instance be connected through a separate switch to the direct current buss 111 so that each stepwise movement of the rotary contacts 106 of this switch would thereby produce a corresponding program change. In this manner, it is possible to provide for the playing of any number of selections from any one of the magnetic tape cartridges in any desired order of cartridge selection. It will be appreciated that this latter modification requires a rather large multiplicity of individual switches in the switch bank 109 and is consequently particularly adapted to more extensive installations. With the provision of a capacitor which is charged and discharged through the control winding of the second stepping switch, it is possible to provide a voltage pulse to the second stepping switch for each movement of the rotary contact of the first stepping switch so that normal and conventional operation of the stepping switches is achieved.

Figure 6:
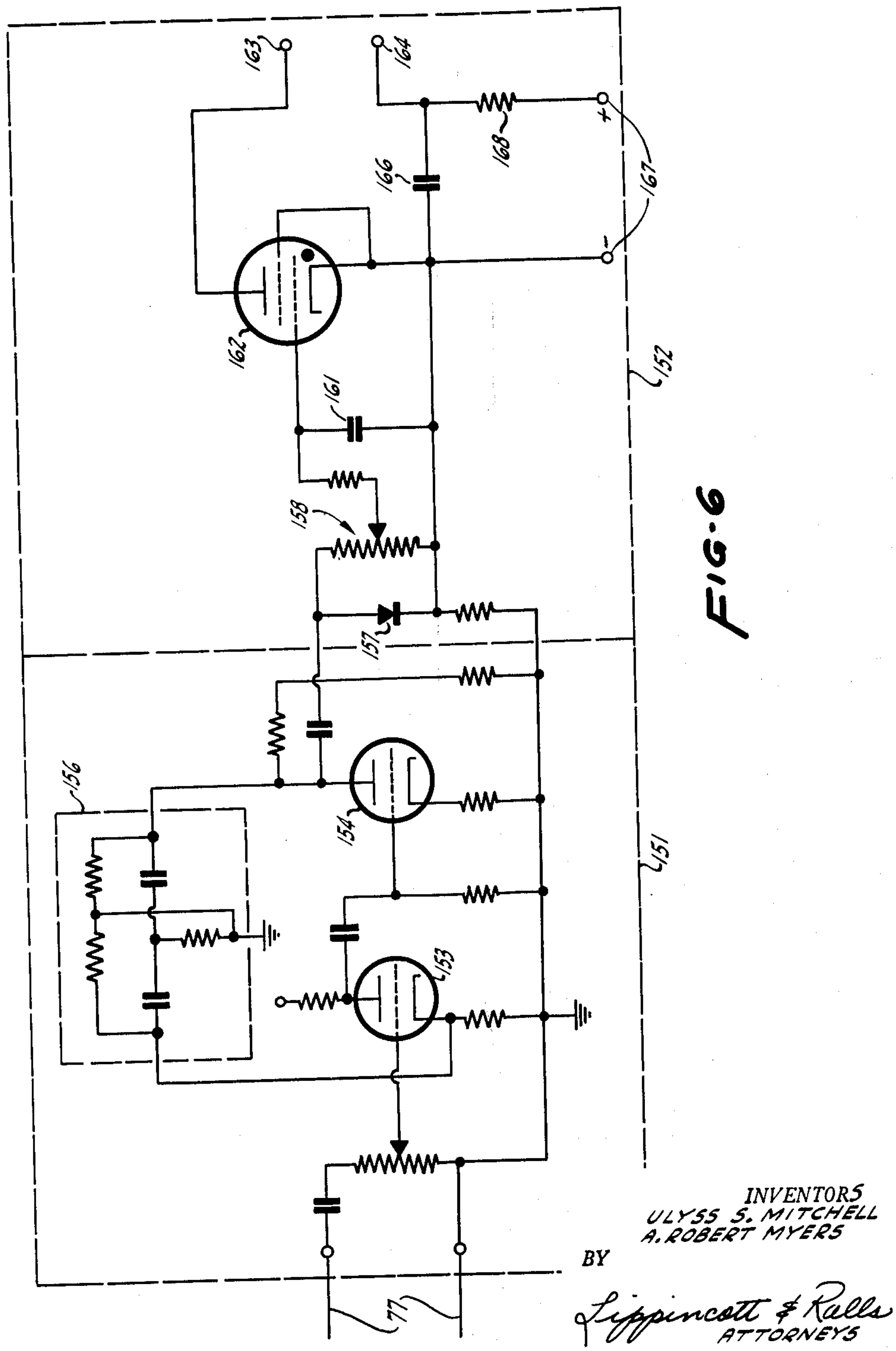
FIGURE 6 is a circuit diagram of an alternate control circuit particularly adapted associating the apparatus hereof with a slide projector.

A practical and interesting application of the present invention is in connection with slide projectors. In accordance with the present invention, it is possible to provide running commentaries previously recorded and automatically synchronized with individual slides to be displayed by a conventional slide projector. While the foregoing embodiment of the invention is quite suited to this application, certain modifications of the invention are shown in FIGURE 6 which are particularly adapted to such application and which are also of general utility in conection with this invention. Referring now to FIGURE 6 of the drawing, there is illustrated an amplifier 151 connected to a control unit 152 and providing signals suitable for operation of the switching arrangement of FIGURE 4 as well as operation of a slide projector. Input leads 77 correspond to those illustrated in FIGURE 4 and extending from the preamplifier 73 of the circuit of this invention. It is herein contemplated that the prerecorded magnetic tape shall be originally recorded in synchronism with the showing of individual slides with a slide projector so as to provide appropriate sequencing of the commentaries upon the tape as well as suitable time intervals for the showing of the individual slides. Thus, the prerecorded magnetic tape is particularly adapted to predetermined sequence of slide display. Furthermore, there is herein provided as an extension of the silent sensing principle of this invention, the recording upon the magnetic tape, together with the commentaries relating to the individual slides and such background music as may be desired, a low frequency signal of sub-audible amplitude which is synchronized with the comments recorded upon the tape. This low frequency signal may be coextensive with the time period desired for the showing of each individual slide, or alternatively, the low frequency signal may be inserted upon the tape at the termination of each time interval corresponding to the viewing time of the individual slide. At any rate, there is provided as a part of the input signal supplied by the lead 77 to the amplifier 51 a low frequency signal which is in some manner synchronized with the individual commentaries contained upon the tape and related to the time intervals during which the separate slides are to be viewed. The input signal received through the lead 77 is coupled through a capacitor and variable resistor to a first amplifier tube 153 which is conventionally coupled to a second amplifier tube 154. It is herein desired to pass through the amplifier section 151 the low level sensing signal in amplified form. To this end, there is provided a feedback circuit which may be connected between the anode of the second amplifier tube 154 and the cathode of the first amplifier tube 153. The amplifier 151 is, in effect, a band rejection amplifier, wherein but a single frequency is amplified and passed therethrough in amplified form. This is readily accomplished in a variety of ways, and, as illustrated, there is herein provided a bridged T filter 156 connected in the feedback loop of the amplifier to thereby feed back all frequencies except that of the sensing signals. The output of the band rejection amplifier 151 will thus be seen to substantially constitute only an amplified version of this low frequency sensing signal and the same is herein applied to the control unit 152. As may be seen from FIGURE 6, the control unit 152 is substantially identical to the similarly named unit in FIGURE 4 of the drawings. Briefly, a diode 157 is connected across the input of the control unit 152 from the band rejection amplifier 151 to thereby rectify the input voltage. This input voltage is applied through a variable resistor 158 to a capacitor 161 which is connected between the cathode of a gaseous discharge device 162 and the first control electrode of such device. Control is provided by the gaseous discharge device 162 and this control tube is connected with the anode thereof coupled to an output terminal 163 and the cathode thereof coupled to another output terminal 164 through a capacitor 166. A pair of power supply terminals 167 are provided with the negative terminal thereof in direct connection to the cathode of the control tube 162 and the positive terminal thereof connected through a resistor 168 to the output terminal 164 so that in effect the power supply terminals are connected across the capacitor 166. It will be appreciated that with a suitable impedance connected between the output terminals 163 and 164, the control tube 162 has applied thereacross the voltage of the capacitor 166 which is, in turn, determined by the charge applied thereto by the power supply connected between the terminals 167 and charging the capacitor through the resistor 168. The control tube 162 is normally biased to cut off so that same does not conduct, however, upon the reduction of the negative voltage applied to the first control electrode of this tube, the tube conducts to discharge the capacitor 166.

With the control winding of the stepping switch 104 connected between the output terminals 163 and 164 of the circuit of FIGURE 6, in the same manner as illustrated in FIGURE 4 of the drawing, the above described circuit operates to actuate the switching means in the manner previously described. A voltage pulse will appear between the output terminals 163 and 164 for each instance of conduction of the control tube 162. In the present instance, this output voltage pulse may also be employed through conventional connections to actuate the slide mechanism of a slide projector so as to thereby move one slide out of alignment with the light beam thereof and to move another slide into alignment therewith. By the utilization of a low frequency signal recorded upon the magnetic tape, it will be seen that there is herein provided a materially amplified output signal, or at least the output signal is quite possibly of a much greater amplitude than is available in the above described embodiment of the invention. Furthermore, by the utilization of this silent sensing signal, intentional or inadvertent periods of silence upon the recorded tape during a single selection thereon recorded will not serve to actuate the programming unit. By the introduction of a positive-control signal onto the tape, the programming unit operates only in response thereto, and a more positive and foolproof program control is afforded. The facility and applicability of each type of control signalling is believed apparent. Thus, for certain operations wherein the recording is not under the control of the programmer, it is highly desirable to employ the delay system of FIGURE 4 while in the alternative, certain advantages attach to the utilization of a silent sensing signal wherein it is possible to record same upon the tape to be employed in the ultimate program.

As regards possible variations in the multideck mounting and playback unit of the present invention, it is herein noted that one of the decks thereof may be provided with a recording head rather than a playback head. Here, again, an added degree of flexibility is afforded to the user by the provision of such a variation. A conventional recording head may be readily disposed in appropriate orientation with one of the decks of the unit and such provision allows the user of the apparatus to record his own comments or selections for future programming. Likewise, it is possible by the utilization of a recording head upon one deck of the unit to employ conventional circuitry for introducing silent sensing signals during the recording so as to thereby synchronize the selections recorded with the desired time intervals of such as slide viewing. It is also possible by this arrangement to record upon one of the magnetic tapes a combination of the recording upon another tape and a commentary or the like orally presented into a microphone connected to the recording head. A further application for which the present invention is admirably suited is in connection with direct broadcasting means which may be employed simultaneously with the broadcasting of recorded material. With such an arrangement, as may be accomplished through conventional circuitry, it is possible for a spot announcement to be broadcast while the recorded selections continue to be broadcast. In both this latter instance and in the above described circumstance wherein the oral presentation and a recorded selection are recorded together upon a single tape, it is desirable to provide suitable and conventional means for reducing the volume of the recorded selection being played concurrently with the oral presentation. While wide applicability of the innumerable variations possible with the present invention are believed to be self-evident, the minor modifications which are required in the present invention to accomplish same are of such conventional nature as to require no particular or special illustration or description other than the mere identification of same. Consequently, no detailed description of the conventional circuits or components that may be employed in connection with the present invention for the above noted applications are herein included.

Although the present invention has been described with respect to the utilization of conventional single-reel, endless-belt cartridges, it is possible for the multideck mounting and playback unit to handle other types of magnetic-tape cartridges. Thus, for example, multireel cartridges may be employed in the mounting and playback unit hereof, however, certain modifications may be required depending upon the particular physical characteristics of such cartridges. Inasmuch as the magnetic tape must be pulled across the playback or recording head in order to attain satisfactory results, there may be provided in connection with the mounting and playback unit a separate series of heads disposed on the opposite side of the pinch wheel from the plurality of heads illustrated, together with suitable guide means to direct the magnetic tape across these heads and thence through the pinch wheel-capstan engagement. With multiple-reel cartridges it may be necessary for the reels to be rotated in opposite directions under different circumstances so that care must be taken that the tape is at all times pulled across the playback or recording head rather than pushed thereacross.

We claim:

Automatic programming apparatus for a multiplicity of magnetic-tape cartridges comprising a plurality of stacked decks defining cartridge receptacles thereon, a plurality of magnetic-tape playback heads disposed with one adjacent each of said decks, a drive capstan having a plurality of rotatable portions disposed with one adjacent each of said decks, drive means engaging said capstan for rotating same at a controllable rate, a plurality of pivotally mounted gates disposed with one in closing relation to each of said decks, a plurality of solenoid means disposed one upon each of said decks and removably engaging the gate thereat for controllably pivoting same to urge a magnetic-tape cartridge disposed upon such deck into engagement with said drive capstan and playback head thereon, a control unit including a discharge device adapted to produce an output signal of limited duration upon actuation thereof and means including a time-delay circuit coupling said playback heads and said discharge device for actuating the latter following completion of signals from said playback heads, a first stepping switch having a control winding connected in circuit with said discharge device and a rotary contact adapted to successively engage a plurality of stationary contacts in stepwise fashion, power supply means, a switch bank including a plurality of individual switches connected between the stationary contacts of said first stepping switch and one side of said power supply means, means including a reset coil for said first stepping switch connecting the rotary contact of said first stepping switch to the opposite side of said power supply, a second stepping switch having a plurality of stationary contacts individually connected to separate solenoids and a rotary contact adapted to consecutively engage said stationary contacts in stepwise fashion, means coupling said solenoids and second stepping switch across a power supply, and a control winding for said second stepping switch connected in circuit with the rotary contact of said first stepping switch whereby said second stepping switch is actuated by said first stepping switch in response to the receipt at the latter of a predetermined number of control signals to thereby switch energization between said solenoids to play predetermined recorded selections upon the tape of said cartridges.

References Cited by the Examiner

UNITED STATES PATENTS

| | | | |
|---|---|---|---|
| 2,488,482 | 11/1949 | Swarthout et al. | 179—100.1 |
| 2,499,700 | 3/1950 | Tinkham et al. | 179—100.2 |
| 2,571,973 | 10/1951 | Walker | 179—100.1 |
| 2,821,576 | 1/1958 | Gaubert | 179—100.2 |
| 3,083,269 | 3/1963 | Gaubert | 179—100.2 |
| 3,126,162 | 3/1964 | MacKenzie | 169—100.2 X |

IRVING L. SRAGOW, *Primary Examiner.*

BERNARD KONICK, *Examiner.*

H. D. VOLK, *Assistant Examiner.*